United States Patent
Kothari et al.

(10) Patent No.: US 8,869,099 B2
(45) Date of Patent: Oct. 21, 2014

(54) SYSTEM AND METHOD OF ENABLING MULTI-TENANCY FOR SOFTWARE AS A SERVICE APPLICATION

(75) Inventors: Chetan Jagatkishore Kothari, Karnataka (IN); Pawan Chhabra, Haryana (IN)

(73) Assignee: Infosys Limited, Bangalore, Karnataka (IN)

(*) Notice: Subject to any disclaimer, the term of this patent is extended or adjusted under 35 U.S.C. 154(b) by 1137 days.

(21) Appl. No.: 12/510,300

(22) Filed: Jul. 28, 2009

(65) Prior Publication Data
US 2010/0023937 A1 Jan. 28, 2010

(30) Foreign Application Priority Data
Jul. 28, 2008 (IN) ............... 1802/CHE/2008

(51) Int. Cl.
*G06F 9/44* (2006.01)
*G06F 9/445* (2006.01)
*G06Q 10/06* (2012.01)

(52) U.S. Cl.
CPC ............ *G06Q 10/06* (2013.01); *G06F 9/44505* (2013.01)
USPC .......................................... 717/104; 717/106

(58) Field of Classification Search
None
See application file for complete search history.

(56) References Cited

U.S. PATENT DOCUMENTS

| | | |
|---|---|---|
| 6,442,750 B1 | 8/2002 | Lopes et al. |
| 6,467,086 B1 | 10/2002 | Kiczales et al. |
| 6,473,895 B1 | 10/2002 | Lopes et al. |
| 6,539,390 B1 | 3/2003 | Kiczales et al. |
| 6,757,887 B1 | 6/2004 | Kaplan et al. |
| 8,046,441 B2 | 10/2011 | Banerji et al. |
| 2005/0065925 A1* | 3/2005 | Weissman et al. ............... 707/4 |
| 2006/0047835 A1 | 3/2006 | Greaux |
| 2006/0235831 A1 | 10/2006 | Adinolfi et al. |

FOREIGN PATENT DOCUMENTS

EP 1259084 11/2002

* cited by examiner

*Primary Examiner* — Qamrun Nahar
(74) *Attorney, Agent, or Firm* — Michael Best & Friedrich LLP

(57) ABSTRACT

A method and system for enabling multi-tenancy for software as a service application is provided. The method includes defining a plurality of policy configuration files for each tenant of the SaaS application. The method further includes identifying a tenant and tenant-context for the SaaS application. Thereafter, the method includes identifying one or more policy configuration files and then applying one or more variations to one or more variation points to provide the SaaS application to the user.

17 Claims, 2 Drawing Sheets

Figure 1:
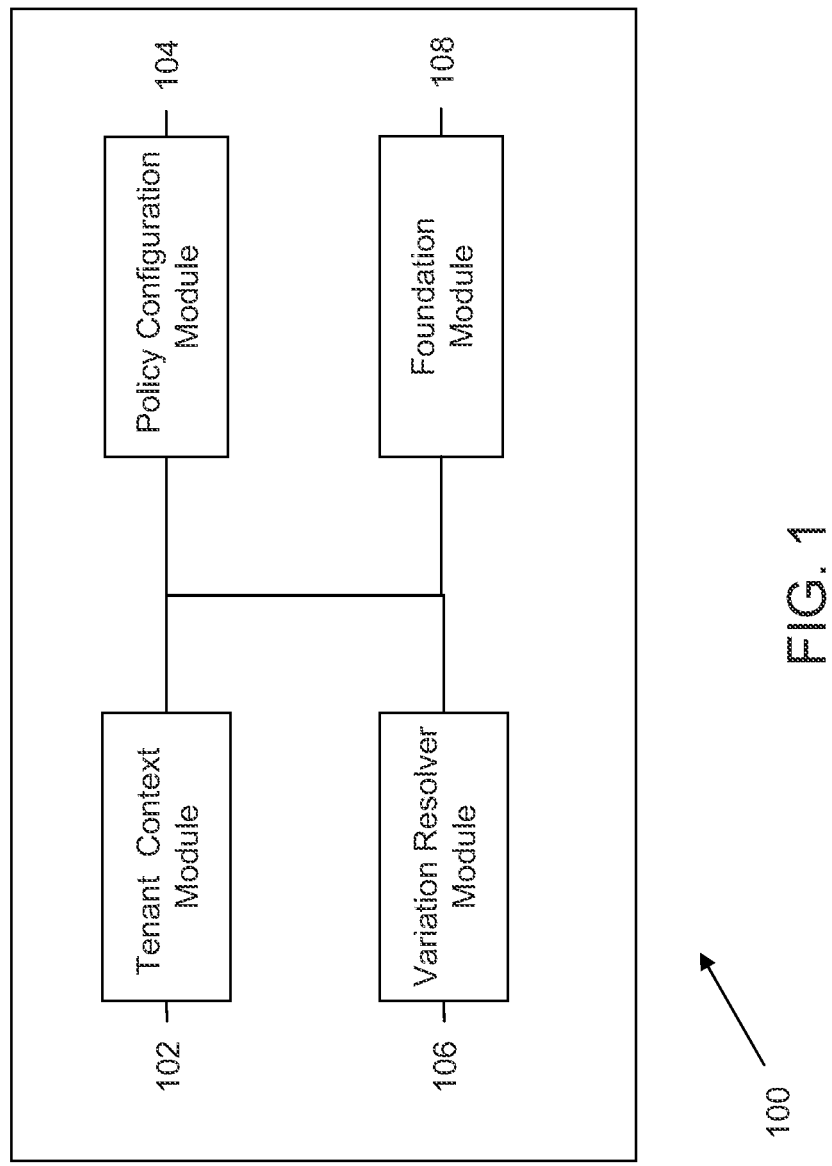

SYSTEM AND METHOD OF ENABLING MULTI-TENANCY FOR SOFTWARE AS A SERVICE APPLICATION

FIELD OF INVENTION

The present invention relates to the field of Software as a Service (SaaS) application. More particularly, the present invention renders SaaS applications to multiple users based on the requirements of the users.

BACKGROUND OF THE INVENTION

Software delivery comprises activities or techniques for making software available to a user. A typical software delivery format includes selling a license for use of software by a software vendor to an end user. The software vendor may provide support to run the software, according to various terms and conditions of the license.

SaaS is a software delivery model that handles multiple user requirements by delivering software as a service to multiple users. The software vendor owns and maintains the required hardware and software to provide the service. Typically, the software vendor provides the service to users on a subscription basis, i.e., users can pay a subscription fee for the software, which runs on the software vendor's server. The users are referred to as tenants, since they subscribe to the service provided by the software vendor.

Generally, software vendors serve multiple tenants by deploying a separate software application for each tenant. The copy provided to a user includes modifications according to the requirements of the tenants. The modifications may include changes in custom extension code, custom processes, custom data extensions, and so forth. In a typical scenario, when multiple tenants are provided with separate software applications, an update in the software has to be distributed and configured for each tenant. Additionally, to implement a modification in the software, the software has to be modified and then redistributed. Further, the software needs to be configured for each tenant individually. Moreover, various organizations require an in-house SaaS Model, which may support multi-tenancy.

Consequently, there is a need for a system and method for enabling a multi-tenant and efficient SaaS application which can be deployed without necessitating individual configuration of software for each tenant. Further, the SaaS application should also address the customization requirements of the SaaS model.

SUMMARY OF THE INVENTION

A method, system and computer program product for enabling multi-tenancy for software as a service application is provided. In an embodiment of the present invention, the SaaS application is provided to multiple users based on individual requirements of the users.

In various embodiments of the present invention, the system for enabling multi-tenancy for a SaaS application includes a tenant-context module configured to identify a tenant and a tenant-context. Further, the system includes a policy configuration module configured to define a plurality of policy configuration files for each tenant. The system also includes a variation resolver module configured to identify one or more variations from the plurality of variations and further configured to apply the one or more variations to the one or more variation points available in layers of a software architecture. Finally, the system includes a foundation module configured to provide underlying architectural strategies to enable the one or more variations.

In various embodiments of the present invention, the plurality of policy configuration files is defined based on requirements of one or more tenants at each layer of software architecture. In an embodiment of the present invention, the software architecture used for implementing a SaaS application is a Java Enterprise Edition (JEE) architecture.

In an embodiment of the present invention, the policy configuration module is further configured to map the plurality of variations on to the tenant-context. The one or more variations and the one or more variation points are identified by the variation resolver module based on the tenant-context.

In an embodiment of the present invention, each of the plurality of policy configuration files is defined using Extensible Markup Language (XML).

In various embodiments of the present invention, the method for enabling multi-tenancy for a SaaS application includes defining a plurality of policy configuration files for each tenant of the SaaS application. Further, the method includes identifying a tenant and tenant-context for the SaaS application. One or more policy configuration files are then identified from the plurality of policy configuration files. Thereafter, one or more variations are applied to one or more variation points available in layers of software architecture to provide the SaaS application to a user.

BRIEF DESCRIPTION OF THE ACCOMPANYING DRAWINGS

Figure 2:
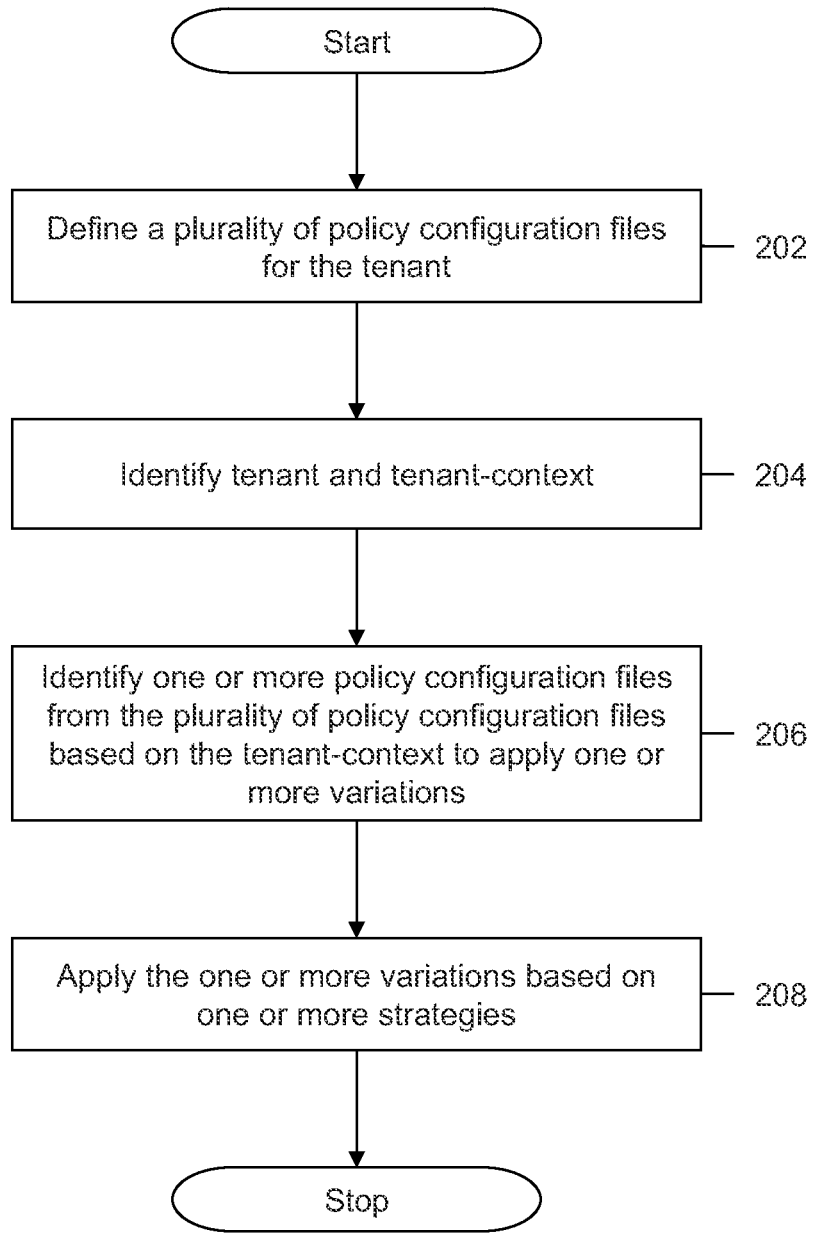

The present invention is described by way of embodiments illustrated in the accompanying drawings wherein:

FIG. 1 illustrates a Software as a Service (SaaS) application, in accordance with an embodiment of the present invention; and FIG. 2 is a flowchart describing a method for providing a SaaS application, in accordance with an embodiment of the present invention.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purpose of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 illustrates a Software as a Service (SaaS) application 100, in accordance with an embodiment of the present invention. SaaS application 100 comprises a tenant-context module 102, a policy configuration module 104, a variation resolver module 106, and a foundation module 108. Tenant-context module 102 is configured to identify a tenant (user) when a tenant logs on to SaaS application 100. The tenant-context module 102 is further configured to identify a tenant-context for the tenant, based on a request. Tenant-context comprises characteristics associated with a tenant of a SaaS application. In an embodiment of the present invention, the tenant-context contains information related to the requirements of the tenant at each layer of the JEE architecture, based on the request received from the user. For example, the tenant-context includes, but is not limited to, tenant identifier, geographical location, Line of Business (LOB), marketing channel or other user-operating environments. The tenant-context further includes a context ID and a context description. In various embodiments of the present invention, the context description includes the requirements of the tenant at each layer of the JEE architecture. The requirements may be in the form of values of identifying factors. Further, the context description may include certain default values, if requirements of the tenant at a layer of the JEE architecture are not available. In an embodiment of the present invention, the tenant-context is captured at the run-time of SaaS application 100 when SaaS application 100 is requested for.

The policy configuration module 104 is configured to define a plurality of policy configuration files for each tenant. In various embodiments of the present invention, the policy configuration files include multiple variations that need to be applied to a plurality of variation points available in various layers of a software architecture for implementing a SaaS application. Variation points refer to those points at each layer of the JEE architecture where the variations corresponding to a tenant can be applied for implementing a SaaS application. In an embodiment of the present invention, the software architecture is Java™ Enterprise Edition (JEE) architecture which is used for supporting SaaS applications for each tenant. JEE architecture is an architecture for supporting applications that are partitioned into several layers or levels. The JEE architecture includes various layers such as a User Interface (UI) layer, an infrastructure service layer, a business logic layer, a data layer and an integration layer. Each layer of the JEE architecture includes one or more variation points available in various layers of the JEE architecture.

In an embodiment of the present invention, the policy configuration files are defined based on various requirements of the tenant such as requirements at the User Interface (UI) layer and business logic layer. The policy configuration files are defined, based on one or more base files. In various embodiments of the present invention, the one or more base files to define the plurality of policy configuration files for each tenant are a set of predetermined identified files from a repository. Typically, the predetermined identified files are defined, based on requirements of various tenants at each layer of the JEE architecture. In an exemplary embodiment of the present invention, the policy configuration files are Extensible Markup Language (XML) files. However, other markup languages can also be used to define the policy configuration files. In an embodiment of the present invention, the policy configuration files are defined at static-time of SaaS application 100 and are thereafter stored in a repository. Further, the policy configuration files may be associated with architectural components such as, services, handlers, tags, etc. Policy configuration module 104 is further configured to map the variations on to tenant-context, which is identified by tenant-context module 102 at the run-time of the SaaS application 100.

Variation resolver module 106 identifies one or more policy configuration files from the defined policy configuration files, based on the identified tenant-contexts. In an embodiment of the present invention, variation resolver module 106 is configured to identify one or more variations from the identified policy configuration files, based on the tenant-context. Moreover, variation resolver module 106 identifies at least one variation point to apply variations. In addition, variation resolver module 106 applies the identified variations to the variation points. In an embodiment of the present invention, the one or more policy configuration files, the one or more variations and the at least one variation point are identified at the run-time of SaaS application 100.

In various embodiments of the present invention, the one or more variation points in the user interface layer are the view layer, the request-processing layer, composition of the UI layer, validations, displays, reusable components like pagination, security filter, other presentation layer capabilities, etc. The one or more variation points in the infrastructure service layer are logging, caching, security, other infrastructure functional components, etc. The one or more variation points in the business logic layer are service implementation layer, service handlers request, business rules, service filter, business processes, other business logic capabilities, etc. The one or more variation points in the data layer are persistence logic, database schemas, object model, etc. The variation points in the integration layer are message schemas, protocols, message formats, routing, other integration capabilities, etc.

Foundation module 108 provides underlying architectural strategies to enable the variations identified by the variation resolver module 106. The variations are applied for a tenant to vary the configuration of SaaS application 100, as required by the tenant, such as variations in User Interface (UI), business logic integrations, etc. Thus, foundation module 108 facilitates in providing SaaS application 100 to the user.

FIG. 2 is a flowchart describing a method for providing a SaaS application, in accordance with an embodiment of the present invention.

At step 202, multiple policy configuration files are defined for each tenant of the SaaS application. The policy configuration files are defined, based on various requirements of the tenant such as requirements at the UI layer, business logic layer, etc. Further, the policy configuration files include one or more variations to be applied to one or more variation points for each tenant. In addition, the plurality of policy configuration files is defined, based on the one or more base files. The plurality of variations is mapped on to various tenant-contexts. In an embodiment of the present invention, the plurality of policy configuration files is defined at the static-time of the SaaS application and is thereafter stored in a repository. In an exemplary embodiment of the present invention, the policy configuration files are XML files. However, other markup languages can also be used to define the policy configuration files. In various embodiments of the present invention, the policy configuration files are associated with architectural components such as services, request handlers, tags, etc.

In various embodiments of the present invention, the one or more base files to define the plurality of policy configuration files for each tenant are a set of predetermined identified files from a repository. Typically, the files are identified based on the requirements of various tenants at each layer of the JEE architecture.

At step 204, a tenant is identified when a user makes a request for a SaaS application. Further, a tenant-context is identified for the user after the user has made the request for the SaaS application. The tenant-context contains information related to the requirements of the tenant at various layers of the JEE architecture, based on the request from the user. Typically, the tenant-context is captured at the run-time of the SaaS application. In various embodiments of the present invention, the tenant-context includes, but is not limited to, tenant identifier, geographical location, LOB, and marketing channel. The tenant-context further includes a context ID and a context description. In an embodiment of the present invention, the requirements are in the form of values. Further, the context description may contain default values if the requirements of the tenant at a layer of the JEE architecture are not available.

At step 206, one or more policy configuration files are identified from the plurality of policy configuration files, based on the tenant-context of the user when the user makes a request for the SaaS application. Further, one or more variations of the plurality of variations are identified from the one or more policy configuration files, based on the tenant-context. In an embodiment of the present invention, the plurality of variations is the variations required in the SaaS application for the tenant, such as variations in user-interface requirements, infrastructure service layer requirements, business logic requirements, and the like. Moreover, at least one variation point of the one or more variation points is identified, based on the tenant-context. In an embodiment of the present invention, the one or more policy configuration files, the one or more variations and the at least one variation point are identified at the run-time of the SaaS application.

At step 208, the one or more variations are applied to one or more identified variation points. The one or more variations are applied from the identified one or more policy configuration files. Further, the one or more variations are applied, based on one or more strategies. Therefore, by applying the one or more variations to the one or more identified variation points, the SaaS application is provided to the user.

In accordance with an exemplary embodiment of the present invention, an implementation of the SaaS application for the plurality of tenants includes the implementation at the one or more variation points at each layer of the JEE architecture. The JEE architecture includes the UI layer, the infrastructure service layer, the business logic layer, the data layer, and the integration layer. In addition, one or more strategies are employed for the implementation at the plurality of variation points.

The UI layer includes one or more variation points—the view layer, the request-processing layer, composition of the UI layer, validations, display text, reusable components like pagination, filters and other presentation aspects. In various embodiments of the present invention, the SaaS application provides multi-tenancy at the one or more variation points of the UI layer by varying page flow mappings, request-processing mechanism, and composition of the UI, such as headers, footers, etc. Validation requirements such as credit card validation requirements, displays such as changing text messages or changing language of text messages, pagination such as changing number of records to be displayed, and storing rights in accordance with the identified tenant-context are also varied to provide multi-tenancy.

In an embodiment of the present invention, the one or more variations from the one or more policy configuration files are applied at the one or more variation points in the UI layer, based on the one or more strategies. For example, the variations in page-flow mapping can be applied by loading the one or more base files and then loading the one or more variations from the one or more policy configuration files at the run-time of the SaaS application. Alternatively, the one or more base files and variations can be mapped on to a different file, to be loaded together at the run-time of the SaaS application.

In another embodiment of the present invention, the one or more variations in the infrastructure service layer are logging, caching, security, etc. In various embodiments of the present invention, the SaaS application provides multi-tenancy at the one or more variation points of the infrastructure service layer by varying the logging requirements such as the location of a log file, caching requirements, security requirements, in accordance with the identified tenant-context. The one or more variations from the one or more policy configuration files are applied at the one or more variation points in the infrastructure service layer by using one or more strategies. For example, the variations in logging requirements can be managed by creating different logging objects for different contexts to handle the multi-tenancy requirements.

In various embodiments of the present invention, one or more variation points in the business logic layer are the service implementation layer, service handlers request, business rules, service filter, business processes, etc. In various embodiments of the present invention, the SaaS application provides multi-tenancy at the one or more variation points of the business logic layer by varying the service implementation, the request-handling mechanism, business rules, business processes, and so forth, in accordance with the identified tenant-context. The one or more variations from the one or more policy configuration files are applied at the one or more variation points in the business logic layer and can be applied using one or more strategies. For example, variations in the service implementation are applied by loading handlers, based on the tenant-context at the run-time of the SaaS application. The one or more base files and the variations included in the one or more policy configuration files contain handlers configured for a default context and the tenant-context. Further, the handlers are configured at the static-time of the SaaS application.

In an embodiment of the present invention, one or more variations in the data layer are database schema, persistence logic, object model, etc. In various embodiments of the present invention, the SaaS application provides multi-tenancy at the one or more variation points of the data layer by varying access to data-access objects and query mapping mechanism based on tenant-context identified for the data layer. The one or more variations from the one or more policy configuration files are applied at the one or more variation points in the data layer and can be applied using one or more strategies. For example, access to data-access objects can be varied by inserting the one or more base files and the variations from the one or more policy configuration files into the database at the compile-time of the SaaS application, and loading the one or more base files and the variations at the run-time of the SaaS application.

In various embodiments of the present invention, the SaaS application provides multi-tenancy at the variation point of the integration layer by varying the message formats, communication protocols, and message routing and transformation, based on tenant-context identified for the integration layer. The one or more variations from the one or more policy configuration files are applied at the variation point in the integration layer by using one or more strategies. For example, the policy configuration files created at the static-time of the SaaS application are loaded at the run-time of the SaaS application. Further, the decision for routing, transformation, communication mechanism and message formats are taken at the run-time of the SaaS application, based on the tenant-context.

The SaaS application of the present invention can be used to meet the requirements of a plurality of tenants. To provide the SaaS application to the tenant, only the plurality of variations needs to be defined, based on the requirements of the tenant. Therefore, there are no significant architectural changes involved in providing the SaaS application to the tenant with significant reduction in cost and time. The SaaS application is effective in handling multi-tenancy requirements. In addition, only one instance of the SaaS application can be used to meet the requirements of the plurality of tenants. The SaaS application is provided to multiple tenants by loading the identified variations for each tenant. Therefore, the SaaS application effectively handles multi-tenancy and customization requirements through a single instance.

The system for providing multi-tenancy by using a SaaS application, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method for the present invention.

The computer system executes a set of program instructions that is stored in one or more storage elements, to process input data. These storage elements can also hold data or other information, as desired, and may be in the form of an information source or a physical memory element present in the processing machine. Exemplary storage elements include a hard disk, a DRAM, an SRAM and an EPROM. The storage element may be external to the computer system, and connected to or inserted into the computer to be downloaded at or prior to the time of use. Examples of such external computer program products are computer-readable storage mediums such as CD-ROMS, Flash memory, floppy disks, etc.

The set of program instructions may include various commands that instruct the processing machine to perform specific tasks such as the steps that constitute the method for the present invention. The set of instructions may be in the form of a computer generated code or a software program. The software or computer generated code may be in various forms such as system software or application software. Further, the software or computer generated code may be in the form of a collection of separate programs, a program module with a larger program, or a portion of a program module. The software or computer generated code may also include modular programming in the form of object-oriented programming. The software program containing the set of instructions can be embedded in a computer program product, for use with a computer, the computer program product comprising a computer-usable medium with a computer-readable program code that is embodied therein. Processing of input data by the processing machine may be in response to users' commands, to the results of previous processing, or to a request made by another processing machine.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

What is claimed is:

1. A system for enabling multi-tenancy for a Software as a Service (SaaS) application, the system comprising:
   a processor;
   a tenant-context module, configured to (i) identify a tenant responsive to a request for the SaaS application by the tenant and (ii) identify during run-time of the SaaS application, a tenant context including a context description, wherein the context description defines software functionality required by the tenant at one or more layers of a software architecture;
   a policy configuration module, configured to define a plurality of policy configuration files for each tenant, the plurality of policy configuration files for each tenant defining a plurality of variations applicable at one or more variation points in the software architecture, wherein one or more of said plurality of variations are implementable for configuring the SaaS application to achieve software functionality requirements defined within an identified tenant context for a tenant to which said plurality of policy configuration files corresponds;
   a variation resolver module, configured to select from among the plurality of variations corresponding to a tenant identified by the tenant context module, one or more variations required to configure the SaaS application to achieve the required software functionality defined by the context description corresponding to such tenant, and further configured to apply the selected one or more variations to corresponding one or more variation points in the software architecture; and
   a foundation module configured to provide underlying architectural strategies to enable the identified one or more variations.

2. The system of claim 1, wherein the tenant context comprises a tenant identifier, a geographical location, a line of business, a marketing channel, a user operating environment, and a context identifier.

3. The system of claim 1, wherein the required software functionality defined by the context description are in the form of values of identifying factors.

4. The system of claim 1, wherein each of the plurality of policy configuration files is defined using Extensible Markup Language (XML).

5. The system of claim 1, wherein the plurality of policy configuration files is associated with architectural components such as services, handlers, and tags.

6. The system of claim 1, wherein the plurality of policy configuration files is defined based on one or more base files stored in a repository, wherein one or more base files are XML files.

7. The system of claim 1, wherein the policy configuration module is further configured to map the plurality of variations on to the tenant-context.

8. The system of claim 1, wherein the corresponding one or more variation points are identified based on the tenant-context.

9. The system of claim 8, wherein the software architecture is a Java Enterprise Edition (JEE) architecture.

10. The system of claim 9, wherein the one or more variation points available in layers of the JEE architecture are a user interface layer, an infrastructure service layer, a business logic layer, a data layer and an integration layer.

11. The system of claim 10, wherein the one or more variations in the user interface layer are view layer, request-processing layer, composition of user interface layer, validations, displays, pagination, security filter and presentation layer capabilities.

12. The system of claim 10, wherein the one or more variations in the infrastructure service layer are logging, caching, security and infrastructure functional components.

13. The system of claim 10, wherein the one or more variations in the business logic layer are service implementation layer, service handlers request, business rules, service filter, business processes and business logic capabilities.

14. The system of claim 10, wherein the one or more variations in the data layer are persistence logic, database schemas and object model.

15. The system of claim 10, wherein the one or more variations in the integration layer are message schemas, protocols, message formats, routing and integration capabilities.

16. A method of enabling multi-tenancy for SaaS application for a user, the method comprising:
- defining a plurality of policy configuration files for each tenant of the SaaS application, wherein the plurality of policy configuration files for each tenant define a plurality of variations applicable at one or more variation points in software architecture of the SaaS application,
- wherein one or more of said plurality of variations are implementable at one or more variation points within the software architecture for configuring the SaaS application to achieve software functionality required by a tenant to which the plurality of policy configuration files corresponds;
- responsive to a request for the SaaS application, identifying a tenant;
- identify during run-time of the SaaS application, a tenant-context corresponding to the identified tenant, said tenant context including a context description defining software functionality required by the identified tenant at one or more layers of the software architecture;
- based on the tenant-context, selecting one or more variations from among the plurality of variations defined by policy configuration files corresponding to the identified tenant, wherein the selected one or more variations are implementable within the SaaS application to achieve the required software functionality defined by the context description corresponding to the identified tenant; and
- applying the selected one or more variations to one or more variation points in the software architecture to configure the SaaS application to achieve the required software functionality of the identified tenant, wherein the one or more variations are applied based on one or more strategies for applying said variations.

17. A computer program product comprising a non-transitory computer usable medium having a computer readable program code embodied therein for enabling multi-tenancy for SaaS application for a user, the computer program product comprising:
- program instruction means for defining a plurality of policy configuration files for each tenant of the SaaS application, wherein the plurality of policy configuration files for each tenant define a plurality of variations applicable at one or more variation points in software architecture of the SaaS application, wherein one or more of said plurality of variations are implementable at one or more variation points within the software architecture for configuring the SaaS application to achieve software functionality required by a tenant to which the plurality of policy configuration files corresponds;
- program instruction means for identifying a tenant, responsive to a request for the SaaS application;
- program instruction means for identifying during run-time of the SaaS application, a tenant-context corresponding to the identified tenant, said tenant context including a context description defining software functionality required by the identified tenant at one or more layers of the software architecture;
- program instruction means for selecting based on the tenant-context, one or more variations from among the plurality of variations defined by policy configuration files from the plurality of policy configuration files, corresponding to the identified tenant, wherein the selected one or more variations are implementable within the SaaS application to achieve the required software functionality defined by the context description corresponding to the identified tenant; and
- program instruction means for applying the selected one or more variations to one or more variation points in the software architecture to configure the SaaS application to achieve the software functionality required by the identified tenant, wherein the one or more variations are applied based on one or more strategies for applying said variations.

\* \* \* \* \*